United States Patent [19]

Hall, Jr. et al.

[11] Patent Number: 5,210,165

[45] Date of Patent: May 11, 1993

[54] ALKYL VINYLIDENE CYANIDE POLYMERS EXHIBITING NONLINEAR OPTICAL AND PIEZOELECTRIC PROPERTIES

[75] Inventors: Henry K. Hall, Jr.; Tun F. Way, both of Tucson, Ariz.

[73] Assignee: Hoechst Celanese Corp., Somerville, N.J.

[21] Appl. No.: 718,885

[22] Filed: Jun. 21, 1991

[51] Int. Cl.$^5$ .............................. C08F 222/34
[52] U.S. Cl. ..................... 526/300; 522/173
[58] Field of Search ............ 526/300; 522/28, 62, 522/173

[56] References Cited

U.S. PATENT DOCUMENTS

| 4,990,584 | 2/1991 | Kishimoto et al. | 526/300 |
| 5,057,588 | 10/1991 | East et al. | 526/300 |
| 5,061,760 | 10/1991 | East et al. | 525/328.2 |

OTHER PUBLICATIONS

T-F Way & H. K. Hall, Jr. (1990) Polym. Bull. 24(2), 151–156.

J. P. Monthéard et al. (1991) Makromol. Chem. 192(2) 341–349 [published Feb. 1991-PTO:STIC].

Kharas, G. B. et al. (1989) Macromol 22, 3871–3877.

G. B. Kharas et al. (1988) Polym Preprints (ACS) 29, 180–181.

H. Gilbert et al. (1956) J. Am. Chem. Soc. 78, 1669–1675.

*Primary Examiner*—Joseph L. Schofer
*Assistant Examiner*—M. Nagumo
*Attorney, Agent, or Firm*—P. S. Kalyanaraman

[57] ABSTRACT

This invention provides novel polymers containing alkyl vinylidene cyanide moieties that exhibit nonlinear optical and piezoelectric properties. The polymers have utility as media in optical devices.

An invention polymer is illustrated by the copolymer of the following structure:

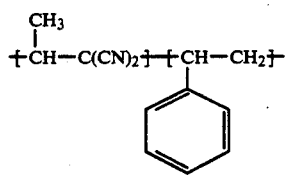

13 Claims, No Drawings

ALKYL VINYLIDENE CYANIDE POLYMERS EXHIBITING NONLINEAR OPTICAL AND PIEZOELECTRIC PROPERTIES

This invention was made with Government support under Contract Number N000087-K-0438. The Federal Government has certain rights in this invention.

BACKGROUND OF THE INVENTION

This invention relates to polymers containing alkyl vinylidene cyanide moieties an exhibiting nonlinear optical and piezoelectric properties.

Nonlinear optical activities generally result from interaction of materials with light, and are described in terms of second order nonlinearity, third order nonlinearity, and so on. An introduction to the theory and practical applications of nonlinearity, especially of organic materials, is provided by *Nonlinear Optical Properties of Organic Molecules and Crystals*, Volumes 1 & 2, edited by D. S. Chemla and J. Zyss, Academic Press, 1987.

It is known that organic small molecules and polymeric materials with large delocalized $\pi$-electron systems can exhibit nonlinear optical response, which in many cases is a much larger response than that exhibited by inorganic materials. Examples of such organic small molecules include 2-methyl-4-nitroaniline. Examples of such polymers are described in *Nonlinear Optical Properties of Organic and Polymeric Materials*, ed. D. J. Williams, ACS Symposium Series No. 233, American Chemical Society, Washington, D.C., 1983. Such materials generally contain in their nonlinear molecular units electron donor groups and acceptor groups linked by a conjugated $\pi$-electron unit. This structural pattern gives rise to delocalization of the $\pi$-electrons. The delocalized $\pi$-electrons are believed to give rise to nonlinear effects when the material interacts with high intensity laser radiation. These effects are manifested as generation of different orders of light frequencies called harmonic frequencies.

While a nonlinear molecule can theoretically generate different orders of harmonic frequencies when it interacts with light, it is generally believed that in order to generate the even numbered harmonic frequencies such as second order, fourth order, and the like, the molecule must possess a "non-centrosymmetric" structure. The non-centrosymmetric structure may be inherent in the molecule or induced externally. A theoretical explanation of non-centrosymmetry and its relationship to harmonic generation can be found in *Nonlinear Optical Properties of Organic and Polymeric Materials*, referred to above.

Piezoelectricity is the property where electric polarization is produced in a material by application of mechanical strain. Early observations of piezoelectricity were mostly in inorganic crystals such as quartz and Rochelle's salt. However, recently, more and more organic materials, particularly organic polymers, are being shown to possess piezoelectric properties. A historical perspective of the occurrence of piezoelectricity in materials is discussed by P. E. Dunn and S. H. Carr in *MRS Bulletin*, No. 2 (1989), pages 22–31, published by the Materials Research Society, Pittsburgh, Pa. Other publications of interest in this regard are *Electronic Properties of Polymers*, by R. Glen Kepler in *Treatise on Materials Science and Technology*, Volume 10, Edited by J. M. Schultz, Academic Press, New York (1977), pages 670–673; *McGraw-Hill Encyclopedia of Science and Technology*, Volume 10, pages 216–223, McGraw-Hill Book Company, Inc. (1960); and E. Kolm and H. Kolm, *Chemtech*, 180 (March 1983).

For both nonlinear optical applications and piezoelectric applications, organic polymers are preferred due to their many advantages. For example, several organic polymers can be cast as thin films by techniques well known in the art. Thin films have the advantage of better utility than single crystals in device fabrication. Furthermore, organic and polymeric materials can be modified structurally to suitably optimize properties such as mechanical stability, thermooxidative stability, and laser damage threshold. Laser damage threshold is an expression of the ability of a material to withstand high intensity laser radiation. The utility of a nonlinear optical material frequently is in a device where the material is subjected to high intensity laser radiation. Unless the material is capable of withstanding such radiation, the device may fail in its intended function.

Polymers which exhibit nonlinear optical activity are described in *Nonlinear Optical Properties of Organic and Polymeric Materials*, referred to above, as well as, for example in U.S. Pat. Nos. 4,779,961; 4,865,430 and 4,913,844. Optical devices which have a polymeric nonlinear optical component are described in U.S. Pat. Nos. 4,767,169 and 4,865,406. Devices based on optical nonlinearity of materials are described in U.S. Pat. Nos. 3,234,475; 3,395,329; 3,694,055; 4,428,873; 4,515,429; 4,583,818; and by P. W. Smith et al in *Applied Physics Letters*, 30(6),280 (1977). Devices based on organic materials with conjugated electron systems are described, for example, in U.S. Pat. No. 4,865,406.

Examples of polymers which exhibit piezoelectricity include polyvinyl chloride, polyvinyl fluoride, polyvinylidene fluoride ($PVF_2$), and polyacrylonitrile. The occurrence of piezoelectricity in these materials has been explained by way of electrets. An electret is an insulator to start with, but generates charged state due to a change in its dipole moment when a DC voltage is applied to it. Typically, in the case of piezoelectric polymers, this charged state is achieved by stretching the polymer film and maintaining the film at a high temperature when the DC voltage is applied. The film is then cooled "freezing in" the charged state.

Polymeric electret elements are useful in electroacoustic conversion devices, electro-mechanical conversion devices, pressure-sensitive elements, bimorph elements, microwave detection devices, image-recording light-sensitive elements, and the like. Some of the devices based on piezoelectric polymers are described by J. V. Chatigny and L. E. Robb in *Sensors*, 6 (May 1986) and by P. L. Squire in *Sensors*, 12 (July 1986).

There is a continuing research effort to develop new nonlinear optical and piezoelectric organic systems for prospective novel phenomena and devices.

Among the recent materials that have been studied for their nonlinear optical properties and/or piezoelectric properties, polymers of vinylidene cyanide have received a lot of attention. For example, U.S. Pat. Nos. 2,615,868 and 4,591,465 describe copolymers of vinylidene cyanide. Copending patent application Ser. No. 491,138 filed on Mar. 9, 1990, now U.S. Pat. No. 5,057,588 describes copolymers of vinylidene cyanide; copending patent application Ser. No. 570,064 filed on May 20, 1990, now U.S. Pat. No. 5,061,764 describes copolymers of vinylidene cyanide which exhibit nonlinear optical and piezoelectric properties. S. Miyata et al,

*Polymer Journal*, Vol. 12, page 857 (1980) describe an alternating copolymer of vinylidene cyanide and vinyl acetate that exhibits piezoelectric properties.

While vinylidene cyanide copolymers are known to possess nonlinear optical and piezoelectric properties, there are several disadvantages with those polymers, especially related to their synthesis. The monomer, vinylidene cyanide, is difficult to synthesize. High temperature pyrolytic conditions are employed for the preparation of the monomer, which then has to be handled under special conditions. It is hydrolytically unstable. Storage of the monomer is, therefore, difficult. The quantity of monomer that can be prepared and stored at any given time is consequently limited, and therefore, the quantity of polymers that can be prepared is also limited. Because of the instability of the monomer, preparation of the polymers necessitates employing special and very stringent conditions. This instability of the monomer is also reflected in the homopolymer of vinylidene cyanide. S. Miyata etal, *Polymer Journal* referred to above report that poly(vinylidene cyanide) is so unstable that it undergoes scission by atmospheric moisture at room temperature.

Therefore, there has been a continuing need to make polymers with interesting and improved nonlinear optical and piezoelectric properties from monomers that are readily available or readily synthesizable, and are also stable under ordinary conditions. Such monomers also must be easily polymerizable to make homopolymers as well as copolymerizable with other comonomers. The polymers so obtained should be stable under ordinary conditions, and easily castable as amorphous films, which then may be fabricated into devices.

Accordingly, it is an object of this invention to prepare novel polymers that exhibit interesting nonlinear optical and piezoelectric properties.

It is yet another object of this invention to provide amorphous films made from the above novel polymers.

Other objects and advantages of the present invention shall become apparent from the accompanying description and examples.

SUMMARY OF THE INVENTION

The present invention is characterized by polymers which are characterized by recurring units represented in Formula I:

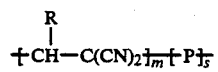

where R represents a C1-C6 alkyl group or a C5-C7 cycloalkyl group, P represents a vinyl monomer moiety, m and s are integers which total at least 50, and the m monomer comprises between about 10-100 mole % of the total (m+s) monomer units. P represents a vinyl monomer moiety, examples of which include styrenic monomers, vinyl acetate, vinyl alkyl ether, and the like. The m monomer in Formula I depicts an alkyl vinylidene cyanide moiety. When s equals zero, the polymer is a homopolymer of an alkyl vinylidene cyanide. When R represents methyl group, the alkyl vinylidene cyanide is methyl vinylidene cyanide.

The present invention also relates to formation of solid film media from the polymers described above. The polymers of this invention have very good solubility in common organic solvents such as halogenated hydrocarbons, ketones, esters, and the like, and can be cast as films, using methods known to those skilled in the art, to obtain films with very low light scattering, typically less than 15%.

DESCRIPTION OF THE INVENTION

The present invention is characterized by polymers which are characterized by recurring units represented in Formula I:

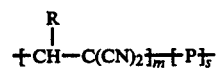

where R represents a C1-C6 alkyl group or a C5-C7 cycloalkyl group, P represents a vinyl monomer moiety, m and s are integers which total at least 50, and the m monomer comprises between about 10-100 mole % of the total (m+s) monomer units. P represents a vinyl monomer moiety, examples of which include styrenic monomers, vinyl acetate, vinyl alkyl ether, and the like. The m monomer in Formula I depicts an alkyl vinylidene cyanide moiety. When s equals zero, the polymer is a homopolymer of an alkyl vinylidene cyanide.

When R in Formula I is methyl group, the alkyl vinylidene cyanide is methyl vinylidene cyanide. The present invention is described here as polymers of methyl vinylidene cyanide The synthesis of methyl vinylidene cyanide was first described by M. R. S. Weir et al in *Canadian Journal of Chemistry*, Vol. 43, page 772 (1985). No study on the polymerizability of this monomer was reported by the authors, although on long standing, a substance of indefinite structure with molecular weights equal to dimer or less than that of trimer was obtained. This lack of study on the polymerizability of this monomer is not surprising, since trisubstituted olefins are not generally known to be easily polymerizable. The present invention discloses a surprisingly facile synthesis of polymers of methyl vinylidene cyanide, with no need for extraordinary conditions in order to maintain the stability of methyl vinylidene cyanide, during its preparation, storage, or its polymerization. Both an oligomer of methyl vinylidene cyanide, as well as copolymers of methyl vinylidene cyanide with other comonomers were prepared.

The oligomer of methyl vinylidene cyanide (Formula III) was prepared as outlined in Scheme 1:

Scheme I

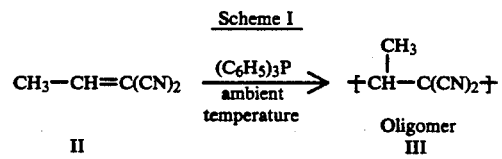

The oligomerization was best done employing anionic polymerization catalysts. Anionic polymerization is described by F. Billmeyer, Jr. in *Textbook of Polymer Science*, 3rd edition, John Wiley & Sons, 88 (1984). Generally, catalysts such as, for example, NaCN, organometal catalysts, $(C_6H_5)_3P$, 1,4-diazabicyclo[2.2.2]octane (Dabco), are used in anionic polymerizations. $(C_6H_5)_3P$, for example, oligomerizes methyl vinylidene cyanide in bulk. Bulk polymerizations are described in *Textbook of Polymer Science*, referred to above, on page 127. Typically ambient temperature conditions are adequate to polymerize II in bulk, catalyzed by $(C_6H_5)_3P$, to form III. Product III may be isolated by adding a nonsolvent such as, for example, methanol, benzene, toluene, and the like, to the mixture to precipitate the product, which may be isolated and purified by methods familiar to those skilled in the art. In the above oligomerization reaction, the product was precipitated in toluene, filtered on Whatman ® brand filter papers, and dried in a vacuum oven at 60° C. overnight.

Copolymers of II with other vinyl monomers may also be prepared by bulk polymerization as above, or by free radical polymerization. Free radical polymerizations are described in *Textbook of Polymer Science*, referred to above, on page 50. Generally, catalysts such as azobisisobutyronitrile (AIBN), organic peroxides, diazo compounds and the like, are used as free radical initiators in free radical polymerizations. AIBN is well known and commercially available. The preparation of the copolymer of II with styrene (formula IV) by bulk polymerization with no catalyst is outlined in Scheme 2:

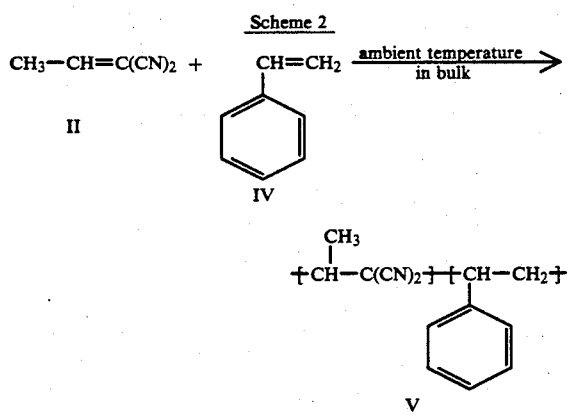

Thus, monomers II and IV may be mixed and allowed to polymerize over 48 hours at ambient temperature to yield polymer V.

Copolymerization of II with ethyl vinyl ether (formula VI) may be done in bulk as above or by using AIBN as catalyst. Sometimes acceleration of the polymerization reaction may be achieved by employing ultraviolet irradiation while using a free radical initiator as catalyst. Scheme 3 outlines the synthesis of the copolymer of II and ethyl vinyl ether (formula VI):

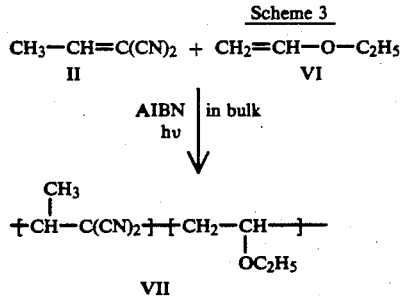

Thus, II and VI may be dissolved in a solvent, such as, for example, dichloroethane. AIBN dissolved in dichloroethane may be added and the mixture left at ambient temperature for 6 hours to form polymer VII.

Occasionally, beneficial effects may be obtained in employing a mixture of AIBN and a Lewis acid as catalyst in the free radical polymerization reaction. Lewis acids that may be employed for this purpose are ZnCl₂, PCl₅, and the like. Scheme 4 describes the preparation of the copolymer IX from II and vinyl acetate (formula VIII):

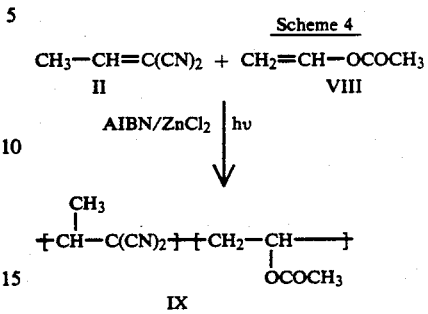

Thus, dried ZnCl₂ and II are mixed in a solvent such as, for example, dichloroethane, AIBN is added to it, followed by vinyl acetate (VIII). The mixture is kept stirring while being irradiated by ultraviolet light for a period of about 10 hours. The product may then be isolated by washing the dichloroethane solution with water to remove any remaining ZnCl₂, drying the dichloroethane solution with a drying agent such as, for example, anhydrous MgSO₄, and then precipitating the polymer IX using a non-solvent, such as for example, methanol. The product, after filtration, may be further purified by dissolving it in a solvent such as dichloroethane, and reprecipitating it with methanol. The filtered and dried polymer can be analyzed by customary techniques known to those skilled in the art, such as, for example, NMR spectrometry, elemental analysis, 9el permeation chromatography, high pressure liquid chromatography, thermal analysis, and the like.

Alternatively, the polymer of Formula IX may also be made by free radical polymerization of monomers of the Formulas II and VIII in the bulk at about 60° C. for about 40–45 hours, using AIBN as the initiator, with no need for any ultraviolet irradiation. The product may then be dissolved in a solvent such as dichloroethane, and precipitated with a nonsolvent such as methanol. Filtration, purification and analysis of polymer IX may be done as above.

The monomer required for the preparation of the above-described polymers is methyl vinylidene cyanide (Formula II). Compound II is prepared via Knoevenagal condensation, following the procedure described by M. R. S. Weir et al, *Canadian Journal of Chemistry*, referred to above, and outlined in Scheme 5. Knoevenagal condensations are described by G. Jones in *Organic Reactions*, Volume 16, John Wiley & Sons, 1967:

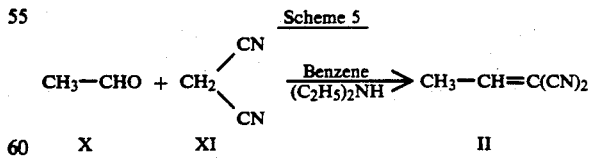

Thus, acetaldehyde (X) and malononitrile (XI) are condensed in a suitable solvent such as benzene in the presence of a base such as diethylamine, (C₂H₅)₂NH. The reaction is done preferably at ambient temperatures for a period of about 2 hours. The benzene solution is washed with an acid such as dilute hydrochloric acid to remove the base, and then with water, dried, and the solvent is removed to yield product II. Product II may be purified by techniques familiar to those skilled in the art, such as for example vacuum distillation, and analyzed by techniques such as NMR spectrometry, IR spectrometry, elemental analysis and the like.

The polymers of the invention may be used to form films by any suitable technique known to those skilled in the art, such as spincoating, dip coating, brush coating, and the like, or by molding techniques such as press molding, calendar molding, and the like. The formed film is amenable to stretching and electric field modes of molecular orientation, and which exhibits a nonlinear optical response and has a high piezoelectric modulus.

An invention electret film exhibits an enhanced level of piezoelectric response when the film polymer matrix has a molecular orientation in the film plane which has been induced by longitudinal uniaxial mechanical stretching, or by longitudinal and transverse biaxial mechanical stretching, and additionally has an electric field induced polarization. Techniques for molecular orientation in polymer electret films by stretching or by an electric field are described in publications such as, for example, U.S. Pat. Nos. 4,302,408 and 4,591,465.

The following nonlimiting examples are provided in order to further illustrate the present invention.

EXAMPLES

In the following Examples, g refers to grams, ml to milliliters, mmole to millimoles, °C. to degrees Celsius, and 'ambient temperatures' to temperatures between 20°-30° C. Ultraviolet irradiations were done using a high pressure Mercury lamp (50 W).

EXAMPLE 1

Preparation of methyl vinylidene cyanide (Formula II)

Benzene (500 ml), acetaldehyde (30 g), and malononitrile (33 g) were added together to a 1 liter round-bottom flask, diethylamine (5 drops) was added, and stirred together at ambient temperature for about 2 hours. The solution was taken in a separatory funnel, washed with dilute hydrochloric acid, and then with water, and the organic layer dried with Drierite ®. The solution was filtered through a Whatman ® No. 1 filter paper into another flask, and the solvents were removed in a rotary evaporator. The clear liquid was transferred into a distillation glassware that had been previously washed well with dilute hydrochloric acid, and distilled in vacuum to yield II as a clear liquid. The product was analyzed by NMR spectrometry, IR spectrometry, and elemental analysis.

EXAMPLE 2

Preparation of the oligomer (Formula III)

A portion of II from Example 1 (4 g., 44 mmole), and $(C_6H_5)_3P$ (2 weight percent) were well mixed in a polymerization tube under nitrogen and kept under nitrogen for about 2 weeks at ambient temperature. It was then dissolved in dimethyl formamide (6 ml), and precipitated with toluene (200 ml). The product (Formula III) was filtered on a Whatman ® brand No. 1 filter paper, and dried. It was then recrystallized from acetone. Yield: 87%; M.Pt. 188° C.. It was analyzed by NMR spectrometry, and Mass spectrometry.

EXAMPLE 3

Preparation of the copolymer of Formula V

A portion of II from Example 1 (1 g., 10 mmole), and styrene (1.13 g., 10 mmole) were combined under nitrogen in a polymerization tube, and then set aside at ambient temperature for about 48 hours. The viscous mixture was then dissolved in dichloroethane (8 ml), and the product IV was precipitated by methanol (160 ml). It was filtered on a Whatman ® brand No.1 filter paper, and dried to yield polymer IV in 73% yield. The product was analyzed by NMR spectrometry, and elemental analysis.

EXAMPLE 4

Preparation of copolymer of Formula VII in bulk

A portion of II from Example 1 (1 g., 10 mmole), and ethyl vinyl ether (0.72 g., 10 mmole) and AIBN (3 weight percent on total monomers) were combined and well mixed in a polymerization tube and irradiated by ultraviolet light at ambient temperature for 6 hours. The mixture was then dissolved in dichloroethane (7 ml), and the product precipitated by adding methanol (140 ml). Polymer VII was filtered, dried and analyzed as in Example 3. Yield: 54%.

EXAMPLE 5

Preparation of copolymer of Formula VII in solution

A portion of II from Example 1 (1 g., 10 mmole) and ethyl vinyl ether (0.72 g., 10 mmole) were dissolved in tetrahydrofuran (7 ml) in a round bottom flask, degassed under nitrogen atmosphere, cooled to 0° C., AIBN (3 weight percent on total monomers) was added, and stirred under an atmosphere of nitrogen at 0° C. for 48 hours. The reaction was then brought up to ambient temperature, and the product was precipitated by adding methanol (140 ml). Polymer VII was filtered, dried and analyzed as in Example 3. Yield: 54%.

EXAMPLE 6

Preparation of copolymer of Formula IX

Anhydrous $AnCl_2$ (1.36 g., 10 mmole) was further dried by heating it at about 200°-300° C. under argon atmosphere for 2 hours, and then cooled to ambient temperature under argon atmosphere. It was then mixed with a portion of compound II from Example 1 (1 g., 10 mmole), and dichloroethane (2 ml) in a round bottom flask. To this mixture, vinyl acetate (0.86 g., 10 mmole) and AIBN (3 weight percent based on the total monomers) were added, and well mixed. The mixture was exposed to ultraviolet irradiation for about 6 hours at ambient temperature. Then the reaction mixture was taken in a separatory funnel, washed with water to remove any $ZnCl_2$, and dried with anhydrous $MgSO_4$. It was filtered using Whatman ® brand No. 1 filter paper, and the solution was diluted with methanol (50 ml) when polymer IX precipitated. The polymer was filtered, and then purified by twice dissolving in dichloroethane (4 ml) and precipitating with methanol (50 ml). Finally it was filtered, dried and analyzed as in Example 3. Yield: 6%.

EXAMPLE 6A

Preparation of copolymer of Formula IX without using ultraviolet irradiation Compound II from Example I (2.76 g., 30 mmoles) and vinyl acetate (2.58 g., 30 mmoles) were mixed in a polymerization tube at ambient temperature. It was kept under nitrogen, AIBN (3 weight percent based on total monomers) was added, and the tube was heated to about 60° C.. It was maintained at about 60° C. for about 40-45 hours. The reaction mixture was then cooled to ambient temperature, and then dissolved in dichloroethane (about 10-15 ml). Addition of methanol (about 100-150 ml) resulted in a precipitate of polymer of Formula IX, which was purified and analyzed as in Example 6 above. Yield: about 37%.

Table 1 lists some polymers prepared according to the present invention. Any temperature variations for the reaction conditions are indicated therein.

TABLE 1

Oligomer and Copolymers of methyl vinylidene cyanide

| Example No. | Polymer Formula | Comonomer | Viscosity $(\eta_{inh})$ (dl/g) | $T_g$ (°C.) |
|---|---|---|---|---|
| 2 | III | — | — | M. Pt. 188 |
| 3 | V | Styrene | 0.91 | 165 |
| 4 | VII | Ethyl vinyl ether | 1.92 | 120 |
| 6 | IX | Vinyl acetate | 0.31 | 155 |
| 6A | IX | Vinyl acetate | 0.44 | 170 |
| 7 | — | Isobutyl vinyl ether | 1.65 | 120 |
| 8 | — | p-Methoxystyrene | 0.77 | 190 |
| 9 | — | Trimethylsilyl vinyl ether | 1.75 | 105 |
| 10 | — | p-Trimethylsiloxystyrene | 3.22 | 80 |
| 11 | — | p-Acetoxystyrene | 0.96 | 180 |

We claim:

1. A polymer which is characterized by repeating units corresponding to the formula

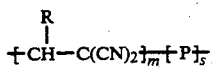

where R represents a C1-C6 primary alkyl group, P represents a vinyl monomer moiety, m and s are integers which total at least 50, and the m monomer comprises between about 10-50 mole % of the total (m+s) monomer units.

2. A polymer as described in claim 1, where R is methyl.

3. A polymer as described in claim 1, where m equals s.

4. A polymer as described in claim 1 or 3, where P represents vinyl acetate.

5. A polymer as described in claim 1, where P represents a styrene moiety.

6. A polymer as described in claim 5, where said styrene moiety is 4-acetoxystyrene.

7. A polymer as described in claim 1 where P represents a vinyl ether.

8. A polymer as described in claim 7, where said vinyl ether is methyl vinyl ether.

9. A second order nonlinear optically active medium comprises a thin film of a polymer which is characterized by repeating units corresponding to the formula:

where R represents a C1-C6 primary alkyl group, P represents a vinyl monomer moiety, m and s are integers which total at least 50, and the m monomer comprises between about 10-50 mole % of the total (m+s) monomer units.

10. A second order nonlinear optical medium as described in claim 9, where R is methyl, m equals s, and P represents a styrene moiety.

11. An electret film of a thermoplastic polymer which is characterized by repeating units corresponding to the formula

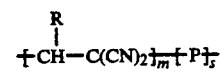

where R represents a C1-C6 primary alkyl group, P represents a vinyl monomer moiety, m and s are integers which total at least 50, and the m monomer comprises between about 10-50 mole % of the total (m+s) monomer units, and the film exhibits piezoelectric properties.

12. An electret film as described in claim 11, where R is methyl, m equals s, and P represents a styrene moiety.

13. An electro-acoustic conversion or electromechanic conversion or pressure-sensitive device having an electret film component of a polymer which is characterized by repeating units corresponding to the formula:

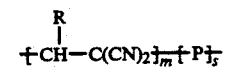

where R represents a C1-C6 primary alkyl group, P represents a vinyl monomer moiety, m and s are integers which total at least 50, and the m monomer comprises between about 10-50 mole % of the total (m+s) monomer units, and wherein the film has an external field-induced net dipolar orientation of polymer molecules, and the film exhibits piezoelectric properties.

* * * * *